United States Patent [19]

van Stiphout et al.

[11] Patent Number: 5,032,853
[45] Date of Patent: Jul. 16, 1991

[54] METHOD OF AND APPARATUS FOR FORMING A MULTI-COLOR IMAGE

[75] Inventors: Johannes G. V. van Stiphout, Maasbree; Martinus J. Huijben, Grubbenvorst; Jacobus H. M. Schonenberg, Velden; Jacobus H. M. Peulen, Haelen; Martin Bakker, Grubbenvorst, all of Netherlands

[73] Assignee: Oce Nederland, B.V., Netherlands

[21] Appl. No.: 447,871

[22] Filed: Dec. 8, 1989

[30] Foreign Application Priority Data

Dec. 15, 1988 [NL] Netherlands ............ 8803064

[51] Int. Cl.$^5$ .......................................... G01D 15/00
[52] U.S. Cl. ...................................................... 346/157
[58] Field of Search ........................................ 346/157

[56] References Cited

U.S. PATENT DOCUMENTS 4,860,035  8/1989  Meuleman et al. ............... 346/157

FOREIGN PATENT DOCUMENTS 44459    6/1983  Japan .
95362    8/1983  Japan .
1277233  6/1972  United Kingdom .

Primary Examiner—Donald A. Griffin
Attorney, Agent, or Firm—Reed Smith Shaw & McClay

[57] ABSTRACT

A method of forming a multi-color image, comprising image elements in a first color which along at least part of their circumference adjoin image elements of one or more following colors wherein separation images in the first, second, third and any following color are each built up from image dot patterns of colored toner powder. The separation images are transferred to an intermediate support to collect said separate images to form a multi-color image. The multi-color image is then transferred from the intermediate support to an image receiving material. The second and each following generated separation image is generated so that the image elements, which on transfer onto the intermediate support are required to adjoin image elements of a separation image already transferred thereto previously, at least partially overlap said previously transferred image elements. The transfer of the second and each following separation image to the intermediate support is effected by pressing the element which bears the separation image against the intermediate support with a force of no more than 1000N per linear meter, whereby the intermediate support has a resilient surface.

The invention also relates to apparatus for performing the method.

8 Claims, 5 Drawing Sheets

METHOD OF AND APPARATUS FOR FORMING A MULTI-COLOR IMAGE

FIELD OF THE INVENTION

The present invention relates to improvements in methods and apparatus for forming multi-color images and, in particular, to generating a second and each following separation image so as to partially overlap a previously generated separation image, and to transferring said second and subsequent separation image to an intermediate support having a resilient surface by pressing the element that bears the separation image against the intermediate support with a force of not more than 1000 N per linear meter.

BACKGROUND OF THE INVENTION

It is known that in forming a multi-color image comprising image elements in a first color which along at least part of their circumference adjoin image elements of one or more following colors to generate separate color images which are each built up from image dot patterns of colored toner powder. These separation images are transferred to an intermediate support to join them to form a multi-color image and the multi-color image thereafter being transferred from the intermediate support to an image receiving material.

Apparatus and methods utilizing such techniques are described, inter alia, in Japanese Patent Application Nos. 58/44459, 58/95362, and UK Patent 1 277 233. One problem which arises in performing these methods is the occurrence of register errors: the separation images are applied to the intermediate support with a shift relative to one another.

Causes of these register errors include tolerances in the parts of the apparatus in which the method is performed and wear of the moving parts of such apparatus. As a result of a register error, image elements of different separation images which are required to adjoin one another in the multi-color image, will locally overlap one another while in other places they are displaced from one another.

The overlap of image elements may result in a loss of information while incomplete adjoining of location of image elements results in the multi-color image showing the background (normally white) of the receiving material between the image elements.

If, for example, mixed colors are produced by means of opaque colored toner powders, by printing fine image dots indistinguishable to the eye in a first, second and any following color in the correct ratios next to one another, a register error also gives rise to problems.

Since image dots of the different separation images then completely or partially overlap one another, there is an incorrect ratio in the image dots of the separation colors and hence the mixed color is different from the required color. The above defects in the final multi-color image are all the more disturbing the larger the register error.

Accordingly, it is an object of the present invention to render substantially invisible the adverse effects of any register error in the multi-color image.

SUMMARY OF THE INVENTION

Generally, the present invention provides a method utilizing separate image registrations wherein the second and each following separation image is generated so that the image elements which on transfer to the intermediate support are required to adjoin image elements of a separation image previously transferred thereto overlap at least partially said previously transferred image elements wherein said transfer includes pressing the element which bears the separation image against the intermediate support with a force of no more than 1000 N per linear meter and that an intermediate support is used which has a surface of resilient material.

By so generating the second and each following separation image to overlap at least partially a separation image previously transferred to the intermediate support, in those areas where they are required to adjoin said separation image, any open spaces which might arise as a result of a register error between the separation images are filled in. The use of an intermediate support with a surface of resilient material and the transfer of the second and each following separation image under the influence of moderate pressure results in a selective transfer of the separation images to the intermediate support. The intermediate support accepts the second separation image and the subsequent separation images only at those locations where there is as yet no colored toner powder from a previously transferred separation image. Where such toner powder is already present, powder particles are not or practically not accepted from a subsequent (overlapping) separation image, so that no disturbing image overlap occurs on the intermediate support. In addition, where opaque toner powders are used, the toner particles still at the top on the intermediate support are, after transfer to the image receiving material, at the bottom and are practically completely screened by the previously formed opaque toner layer or layers.

The intermediate support used in the method of the present invention has a resilient surface covering, e.g., consisting of rubber or elastomeric material. The thickness of this covering is at least 0.5 mm and preferably between 1.5 and 3.5 mm. It may consist of a single layer or a number of superposed layers. The surface of the covering is preferably formed by a smooth layer of silicone rubber preferably having a hardness of between approximately 15° and approximately 80° Shore A.

Suitable silicone rubbers are described inter alia in UK Patents 1 245 426 (U.S. Pat. No. 3,591,276) and 1 279 687 and European Patent Application 0 146 980, Example 1.

BRIEF DESCRIPTION OF THE DRAWINGS

FIGS. 5a-5b illustrate the effects of a register error in the printing device of FIG. 4a;

PRESENTLY PREFERRED EMBODIMENT

Figure 1:
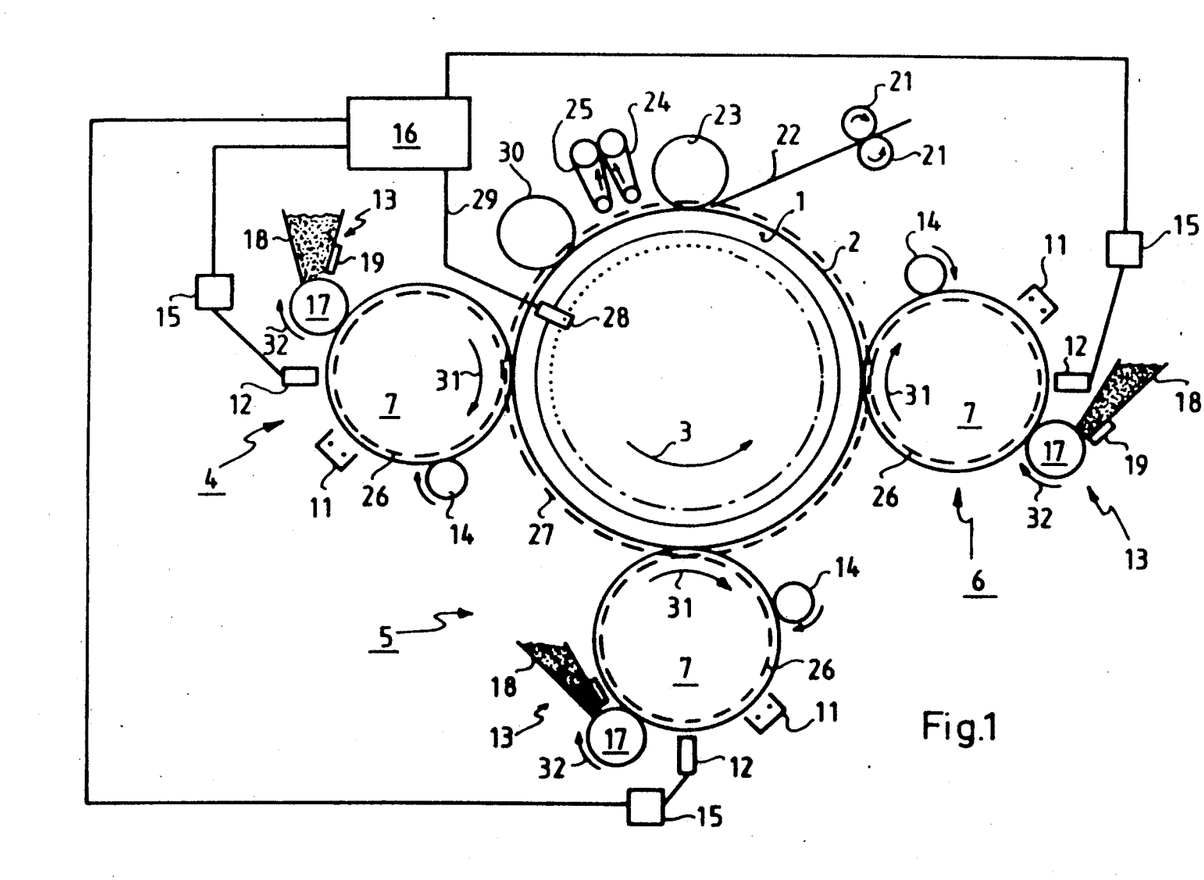
FIG. 1 is a diagrammatic representation of a printing device for performing the method according to the invention.

The printing device represented in FIG. 1 comprises a cylindrical intermediate support 1 which can be driven in the direction of arrow 3 by drive means (not shown). Intermediate support 1 has a metal sleeve, e.g., of aluminum, and a covering 2 of silicone rubber thereon. Covering 2 preferably consists of approximately 2 mm thick underlayer formed from silicone rubber RTV 200/201 of Messrs. Possehl, West Germany, and over this an approximately 200 μm thick top layer of silicone rubber in accordance with Example 8 of UK Patent 1 279 687 having a hardness of approximately 40° Shore A. Image forming stations 4, 5 and 6 are disposed along the path of rotation of intermediate support 1. Each of these image forming stations comprises a cylindrical image registration element 7 on which a separation image is formed. The image registration elements 7 have the same diameter and are all in pressure contact with intermediate support 1, the force with which the image registration elements 7 are pressed against the intermediate support 1 being at maximum 1000 N per linear meter. In this case the force is 250 N.

Each registration element 7 consists of a cylinder with a photoconductive surface layer, the various image forming units being disposed distributedly over the circumference of this cylinder. These image forming units each comprise a corona device 11 for uniformly charging the photoconductive layer, an LED array 12 with which image-wise exposure is carried out, a magnetic brush device 13 to develop the latent charge image which has formed to give a powder image, and a cleaning device 14 for removing residual toner after transfer of the separation image to the intermediate support 1.

The LED array 12 which is, for example, of the type described in U.S. Pat. No. 4,524,372, is connected to an electronic circuit 15 to actuate each LED in the array in accordance with an information pattern to be printed. The electronic circuit 15 of each image forming station is in turn connected to a central control unit 16 which feeds the information concerning the separation image to be printed to each electronic circuit 15 line by line.

Magnetic brush device 13 comprises a magnetic roller 17 disposed a slight distance away from the circumference of the image registration element 7. Preferably roller 17 comprises of a rotatable sleeve with a stationary magnet system therein.

A reservoir 18 filled with electrically conductive magnetically attractable toner powder is disposed at the sleeve of each magnetic roller 17. Each reservoir 18 contains a toner powder in a specific color. A stripper 19 is provided at each reservoir 18 to ensure that an even layer of toner powder is applied to the sleeve of magnetic roller 17.

Also disposed along the path of rotation of intermediate support 1 are feed means for a sheet of image receiving material. The feed means preferably comprises co-operating conveyor rollers 21 and a guide plate 22, a pressure roller 23, discharge means for the sheet of image receiving material having cooperating conveyor belts 24 and 25, and cleaning device 30.

Each image registration element 7 is driven by a gearwheel 26 mounted on the rotational shaft of the image registration element 7 and engaging gearwheel 27 secured to the driven shaft of the intermediate support 1. (In the drawing, gearwheels 26 and 27 are shown as broken circles, these circles indicating the gearwheel pitch circles).

A pulse generator 28 is connected to intermediate support 1 and delivers pulses in relation to the angular rotation of the intermediate support 1. The angular rotation between consecutive pulses corresponds to a movement of the surface of intermediate support 1 over the width of one image line. The recording of consecutive image lines on the image registration elements 7 by LED arrays 12 can thus be controlled by control unit 16 by means of the pulses delivered by the pulse generator 28 and are fed to the control unit 16 via the connection 29.

When the printing device is in operation, intermediate support 1, the image registration elements 7 and magnetic rollers 17 are driven in the direction of arrows 3, 31 and 32. In these conditions, the photoconductive layer of an image registration element 7 after having been given a uniform electrostatic charge by the corona device 11, is image-wise exposed by LED array 12. Thereafter, the latent charge image thereon is developed by magnetic brush device 13 to give a separation image of colored toner powder. By selectively actuating the LED's in the array according to an image pattern an image dot pattern is formed of colored toner powder on image registration element 7.

The information concerning the image lines of the various separation images to be recorded is serially fed, line by line, to a shift register of the electronic circuits 15 by control unit 16. After receipt of the next pulse from the pulse generator 28, the information stored in the shift register of the first image forming station 4 is transferred to an output register and certain LED's are actuated via drivers according to the image line to be recorded. In the meantime the shift register is filled with the information of the next image line. On receipt of the next pulse from pulse generator 28 this image line is recorded. On receipt of a specific pulse from pulse generator 28 the image forming means of the second image forming station 5 are also activated and again a number of pulses later, those of the next image forming station 6 as well. The number of pulses after which the image forming means of the second and the next image forming station (or the next image forming stations) are actuated is predetermined from the distance between the image forming stations as considered along the circumference of intermediate support 1. The correct number of pulses is fixed in a control program stored in a memory of the control unit 16. The separation images formed on the image registration elements 7 are transferred to intermediate support 1 in the various pressure contact zones. The powder image present on intermediate support 1 is then heated in a manner known per se, so that the powder image softens. The softened powder image is then transferred to an image receiving material (e.g. a sheet of paper) in the pressure zone between intermediate support 1 and pressure roller 23, said material having been supplied via feed means 21, 22 at the correct time. The printed image receiving material is discharged by cooperating conveyor belts 24 and 25. Intermediate support 1 then moves past cleaning device 30.

Figure 2A:
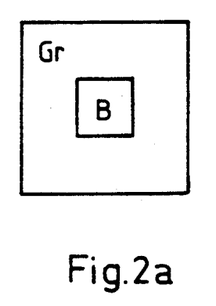
FIGS. 2a-2e give an illustration of the effects of a register error in methods according to the prior art.
Figure 2B:
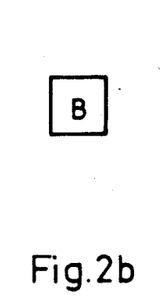
Figure 2C:
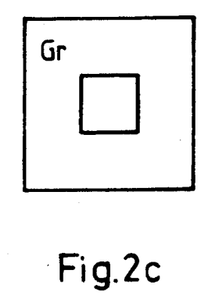

FIGS. 2a-2e illustrate the adverse effects of any register error in methods according to the prior art. FIG. 2a shows the original image to be reproduced, consisting of a blue area (B) against a green background (Gr). The image is formed by combining on an intermediate support a separation image built up from blue image dots (B) as shown in FIG. 2b and a separation image built up from green image dots (Gr) as shown in FIG. 2c.

Figure 2D:
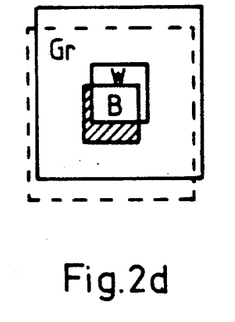
Figure 2E:
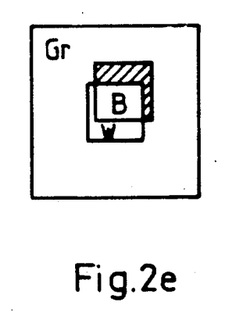

As a result of a register error, the separation images are displaced to some extent with respect to one another on the intermediate support so that the multi-color image shown in FIG. 2d or FIG. 2e forms, depending on whether it is the blue separation image (FIG. 2d) or the green separation image (FIG. 2e) which is first transferred to the intermediate support.

As will be seen from FIGS. 2d en 2e, as a result of the register error the image elements no longer correctly adjoin one another. As a result there is a local overlap (shown in hatching) of green and blue image elements, resulting in a dirty color in that area. In addition, there is local space open between the two image elements, which is not covered by one of the image elements, so that finally the (white) background of the image receiving material is visible on the copy. This space is denoted by "W ."

Figure 3A:
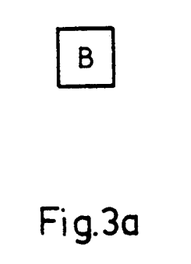
FIGS. 3a-3f illustrate correction of register errors shown in FIG. 2, the solution according to the present invention.
Figure 3B:
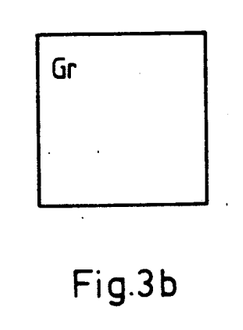
Figure 3C:
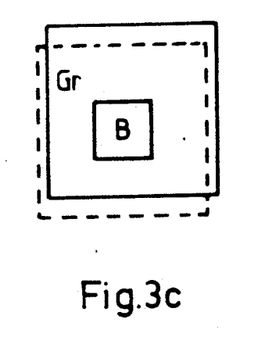

Using the method according to the invention, the adverse effects of the register error indicated in FIGS. 2d and 2e are substantially obviated. As shown in FIGS. 3a–3c, the second separation image, in this case the green separation image (FIG. 3b), is formed overlapping the blue separation image (FIG. 3a).

After the blue separation image has first been applied to the intermediate support the green separation image is then transferred thereto by the application of moderate pressure. The result of this method is shown in FIG. 3c. The green separation image now adjoins the blue separation image everywhere, but as a result of the pressure transfer of the second separation image the colors do not disturbingly overlap one another.

Figure 3D:
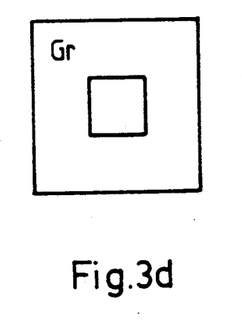
Figure 3E:
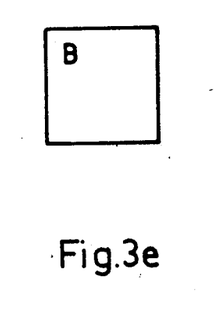
Figure 3F:
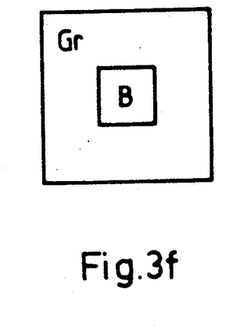

The register error that has occurred does result in a relative shift of the green separation with respect to the blue one, while the multi-color image is also placed on the copy with an offset equal to the register error. However, even this relative shift of the separation image can be obviated by first forming the green separation image (FIG. 3d), then generating the blue separation image overlapping the green separation image (FIG. 3e), and transferring the separation images in that sequence to the intermediate support. The result is shown in FIG. 3f.

If, in the device shown in FIG. 1, the image forming station for forming the green separation image is situated after the station for forming the blue separation image, the method described with reference to FIGS. 3d and 3e can be performed by forming the green separation image in a first revolution of the intermediate support 1 and the blue separation image in a second revolution cycle.

The powder particles of a second or subsequent separation image, which are not or are practically not accepted by the intermediate support 1, because a previously formed powder image is already present there, are removed from image registration element 7 by cleaning device 14.

To be able to generate the second and each subsequent separation image required to adjoin image dot patterns of one or more previously formed separation images, in overlapping relationship with those separation images, control unit 16 is provided with image processing means. These image processing means comprise comparison means which compare the color separation images (uncorrected separation images), which together form the multi-color image, to determine which image dot patterns of a subsequent separation image adjoin image dot patterns of preceding separation images. Considered in the sequence in which the separation images are transferred to the intermediate support, the second (uncorrected) separation image is compared with the first, the third uncorrected separation image is compared with the second uncorrected separation image and with the first separation image, and so on. Also, processing means are provided which by reference to the results obtained from the comparisons carried out by the comparison means, extend the second and each subsequent uncorrected separation image with image dot patterns at those places where they are required to adjoin preceding separation images. The separation images, thus processed, may be stored in a memory, e.g. a bit map memory, and then be fed line by line to the shift register of the electronic circuit 15.

Another image disturbance resulting from a register error can arise in the application in which colored toner powders are used to produce mixed colors, by printing fine image dots indistinguishable to the human eye of a first, second, and any subsequent basic color side by side in the correct ratio. Such a method is required to generate mixed colors when using opaque toner powders. In this condition an algorithm is used, for example, by central control unit 16 of the printing device according to FIG. 1 to calculate the color of the toner powder required to occupy the different image dot locations in a colored area in order to obtain the required (mixed) color.

The algorithm comprises, on the one hand, a separation algorithm by means of which a degree of coverage is calculated for each basic color to achieve the required ratio of image dots of the basic colors, and, on the other hand, a half-tone algorithm in order to calculate, from the degree of coverage, the occupation of the image dot locations in a colored area by a specific basic color.

By means of the information obtained via the algorithm, the central control unit 16 then triggers the LED arrays of image registration elements 7, each of which undertake formation of a separation image.

A register error could result in image dots of the different separation images completely or partially overlapping one another. This might give an incorrect ratio between the image dots of the various basic colors and hence a mixed color different from that required. FIGS. 4a–4b and FIGS. 5a–5b show how a wrong mixed color of this kind can form.

Figure 4A:
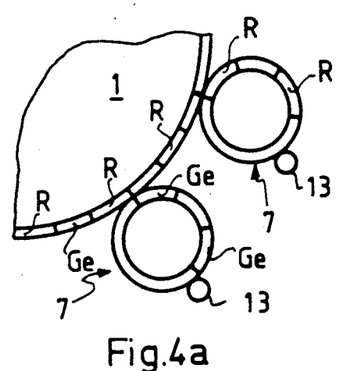
FIGS. 4a-4b diagrammatically represent how a mixed color is formed in a printing device.
Figure 4B:
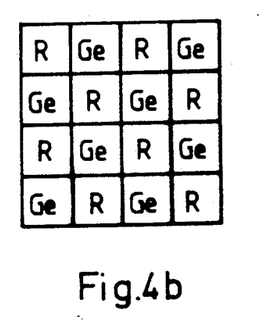

FIG. 4a diagrammatically represents part of the image forming system in which an orange mixed color is required to be formed on intermediate support 1 by means of two image registration elements 7, by building up a colored area from the same number of red (R) as yellow (Ge) image dots (see FIG. 4b).

Figure 5A:
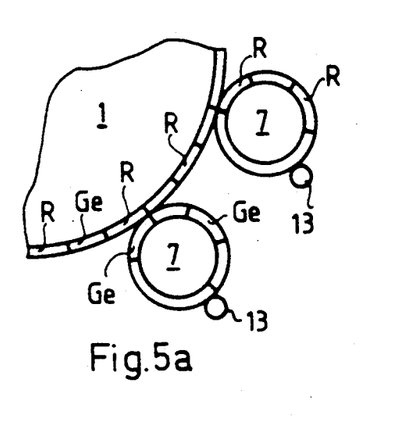
Figure 5B:
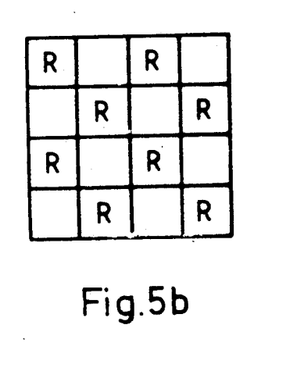

A colored area having a wrong mixed color forms as a result of a register error between the red and the yellow image registration element in a size equal to the dimension of an image dot as shown in FIG. 5a. The yellow image dots coincide with the red image dots already transferred to intermediate support 1, so that these yellow image dots are no longer deposited on support 1. Thus a colored area as shown in FIG. 5b is formed on the copy: a pattern of red image dots on a white background, resulting in a pink mixed color.

The solution to this problem again lies in generating the second and subsequent generated separation images in such manner that the image elements formed therein have an overlap. To achieve this, a correction algorithm is used so that for each separation image formation per colored area the calculated degree of coverage is converted to a corrected degree of coverage.

This corrected degree of coverage is then used as information to trigger the image forming stations in the correct manner via the half-tone algorithm.

Figure 6A:
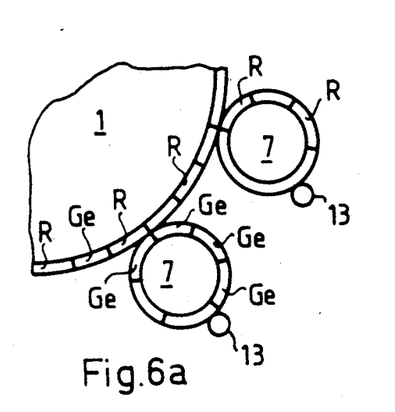
FIGS. 6a-6b illustrate correction of register error shown in FIG. 5b, the solution according to the present invention.
Figure 6B:
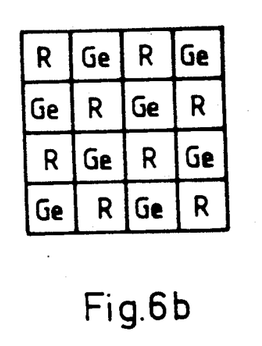

The above solution is illustrated in FIG. 6a. After the image elements in the red color (R) have been formed and transferred to intermediate support 1 in the first separation image formation stage, a yellow separation image (Ge) is formed in the second separation image formation stage, with a degree of coverage equal to the required degree of coverage for yellow plus the degree of coverage of the red separation image formed beforehand. In this example, a yellow separation image in the size of the complete colored area is generated. On transfer of this yellow separation image to intermediate support 1 the yellow separation image is accepted only in those areas where no red image elements are yet present, so that the end result is the correct mixed color pattern forming in the colored area (FIG. 6b).

In a multi-color printer operating by the method according to the invention practically all mixed colors can be composed from the basic colors black, blue, green, red and yellow, by forming these colors in successive image registration elements and transferring them onto the resilient intermediate support in the manner indicated with reference to FIG. 1.

On the basis of the required degree of coverage the correction algorithm calculates the corrected degree of coverage for each separation image (basic color). Half-tone methods known from the art can be used for the half-tone algorithm. Within the known methods, a global division can be made into two groups:

Dither methods: image dots are set aside in accordance with a fixed pattern (e.g., matrix-dither method), and Half-tone methods in which image dots are set aside with a certain arbitrariness (e.g., an error-diffusion method).

In the matrix-dither method, an image is built up from a raster of matrix structures each consisting of a group of associated image dots of one or more different basic colors in order to obtain a specific color or mixed color. Such a matrix structure (also called macro-image dot) consists of a group of image dots, e.g., 6x6 image dots. With this matrix-dither method, the color of toner powder required to occupy each image dot in the macro-image dot is determined by, on the basis of the required degree of coverage per separation image, making a comparison for that macro-image dot with a matrix of threshold levels (threshold matrix) to obtain the correct ratio between the different basic colors.

In order to render adverse effects of register errors as imperceivable as possible, the separation images per macro-image dot are generated with an overlap. By means of the correction algorithm a corrected degree of coverage is for this purpose calculated for each separation image, which corresponds to the required degree of coverage for said separation image plus the cumulated degree of coverage for all the separation images already generated previously.

Figure 7A:
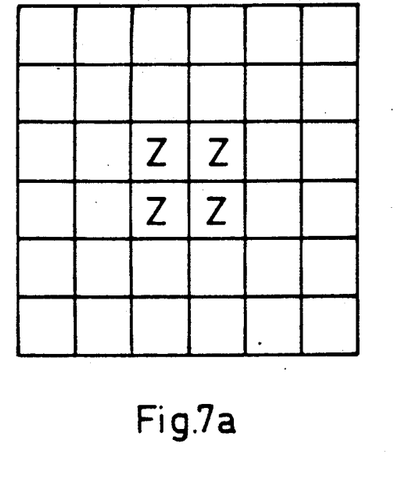
FIGS. 7a-7d diagrammatically represent an example of how a mixed color pattern is obtained according to the invention.
Figure 7B:
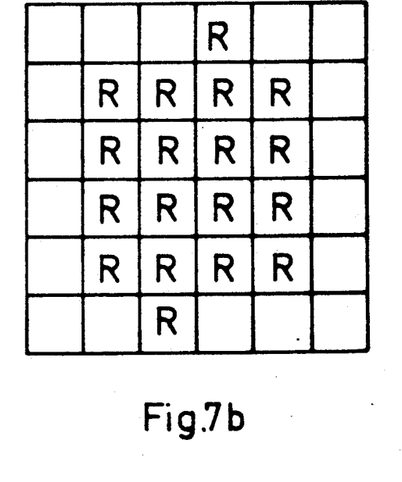
Figure 7C:
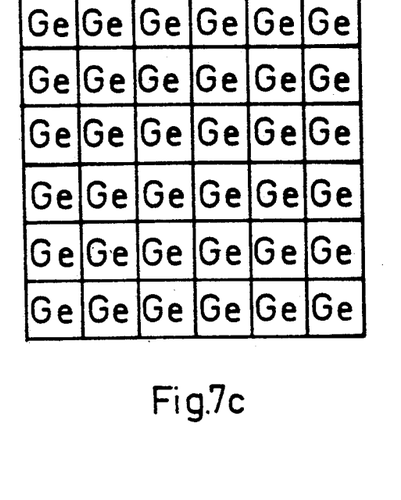
Figure 7D:
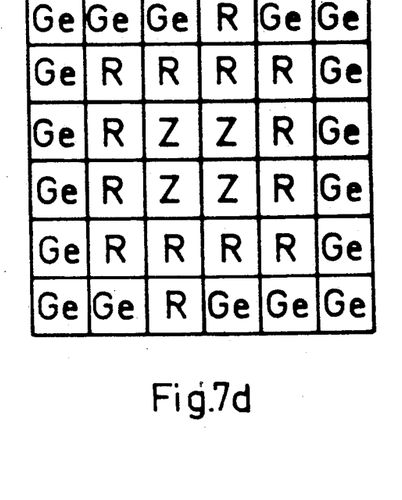

FIGS. 7a-7c are an example of how the correction algorithm can be used with a dither algorithm based on a matrix-dither method to obtain the required mixed color pattern in terms of degree of occupation from the black (Z), red (R) and yellow (Ge) separation images, register errors having no or substantially no effect on the end result (FIG. 7d).

Other known half-tone methods are not based on building up from macro-image dots but take as the basis a colored area for which a specific (mixed) color is to be obtained. In this case, the image dot locations within that colored area are filled in fairly arbitrarily with one of the basic colors in order to obtain on average the correct degree of coverage for each basic color.

In order to compensate for the omission of image dots which would coincide with one another a corrected degree of coverage is again calculated for each separation image. This corrected degree of coverage for each separation image corresponds to the quotient of the required degree of coverage for that separation image and the complement of the cumulated degree of coverage for all the separation images already generated previously.

A colored area which, to give a specific mixed color, must be filled in with a degree of coverage of 50% for black, 25% for red and 25% for blue, is thus obtained by using corrected degrees of coverage of 50% black, 50% red and 100% blue in the separation image sequence: black, red, blue.

The image dot locations can be filled in by means of half-tone methods known in the art, such as error diffusion. These latter methods relate to the performance of the method of passing the statistical error made in filling in a specific image dot on to adjacent image locations in order finally to obtain on average the correct degree of coverage per colored area.

Another embodiment of the method according to the invention is also based on building up each separation image from a raster of matrix structures. In this method the occupation of the image dot locations within each matrix structure is also calculated by making a comparison with a threshold matrix, using a matrix-dither method. By interference of the rasters of the various separation images (especially when a register error occurs) low frequency and, therefore, very troublesome Moire-patterns can form. These Moire-patterns become high frequent by placing the rasters of the matrix structures of the various separation images on each other under mutual different angles. These high frequency Moire-patterns are less troublesome, because the human eye does not observe or only barely observes them.

In order to render substantially invisible the already mentioned adverse effects of register errors, in this embodiment, the separation images of each matrix structure are generated with an overlap. Because the rasters of the matrix structures are placed on each other under mutual different angles, the required overlap is not similar for all places on the multi-color image.

The desired result is nevertheless obtained by applying in this embodiment a correction algorithm according to the already described quotient method. With this correction algorithm a corrected degree of coverage for each separation image is calculated. The corrected degree of coverage corresponds to the quotient of the required degree of coverage for the separation image and the complement of the cumulated degree of coverage for all the separation images already generated.

Using the method according to the invention it is, of course, also possible to print a multi-color image with one or more mixed-color areas built up from adjacent image dots of two or more basic colors adjoining colored areas of just one basic color.

To produce such images, one of the above-described algorithms is used to determine the occupation of the image dot locations in the mixed-color areas and this occupation pattern is filled in the separation image for each color at the associated locations. From a comparison with the second separation image and each subsequent separation image the locations at the edges of color transitions where a subsequent separation image should overlap one or more preceding separation images are then determined. Thereafter, the necessary overlap is filled in the associated separation images by the image processing means. A slight color disturbance may occur at the edge of the mixed-color area when a multi-color image is printed in this way, where the image consisting of a mixed-color area of two basic colors not printed in directly consecutive separation image formations, which mixed-colors area adjoins a colored area of one color printed in the sequence of separation image formations between the two colors of the mixed-color area. This color disturbance is due to the fact that the one-color area is generated with a partial overlap with adjoining previously printed image dots of the mixed-color area so that image dots of the one-color area are deposited, as a result of a register error, in the mixed-color area and partially next to the image dots present there.

This color disturbance may be obviated if the method is so modified that either only the one-color areas or only the mixed-color areas are printed in a first revolution cycle of the intermediate support and then the other areas (mixed-color areas or one-color areas) are printed in a second revolution cycle, which are then generated in overlapping relationship with the areas already printed in the first cycle. Although the method according to the invention has been illustrated with reference to the printing device represented in FIG. 1, the invention is certainly not restricted thereto.

Although the printing device represented in FIG. 1 has three image forming stations, 4, 5, 6 by way of example, a larger number of image forming stations is required to obtain colors and mixed colors on a larger scale.

The method according to the invention can also be performed in an apparatus comprising just one image forming station or a limited number of image forming stations on which images can be generated in different colors. The multi-color image is then formed in successive revolution cycles of the intermediate support co-operating with the or each image forming station. In a specific application (as already indicated hereinbefore), it may also be necessary to use a different printing sequence of the basic colors from the sequence of the image forming stations, as considered in the direction of revolution of the intermediate support. This can be achieved by forming the multi-color image in more than one revolution cycle of the intermediate support in order to obtain the required printing sequence.

In addition, the embodiment of the image forming stations illustrated here can be replaced by one or more other image forming devices known from the art, e.g. based on a magnetographic, electrographic or electrophotographic process, in which a latent magnetic or electrostatic image dot pattern is formed on an image registration medium and this image is developed with colored toner powder, or in which (colored) and possibly conductive toner powder is drawn, by selective energization of image forming electrodes, to a dielectric in accordance with an image dot pattern, from a toner feed means which is in contact with or a short distance from the dielectric.

Accordingly, while presently preferred embodiments of the invention have been shown and described in particularity, the invention may be otherwise embodied within the scope of the appended claims.

What is claimed is:

1. In a method of forming a multi-color image, comprising image elements in a first color which along at least part of their circumference adjoin image elements of one or more following colors wherein separation images in the first, second, third and any following color are built up from image dot patterns of colored toner powder, and transferred to an intermediate support to form a multi-color image and said multi-color image thereafter being transferred to an image receiving material, the improvement therein comprising that said second and each following separation image is generated so that the image elements which on transfer to the intermediate support are required to adjoin image elements of a separation image previously transferred thereto overlap at least partially said previously transferred image elements wherein said transfer includes pressing the element which bears the separation image against the intermediate support with a force of no more than 1000 N per linear meter and that an intermediate support is used which has a surface of resilient material.

2. A method according to claim 1, wherein said overlap generated on each separation image formation contains all the image elements of separation images already formed previously.

3. A method according to claim 1 or 2, including for the generation of image dot patterns of each separation image the use of an algorithm to achieve the required color or mixed color in a specific colored area, said algorithm comprising a separation algorithm, a correction algorithm and a half-tone algorithm, wherein the degree of coverage for each separation image is calculated with said separation algorithm to achieve the correct ratio of image dots in said different colors, a corrected degree of coverage for each separation image is calculated with said correction algorithm to achieve said required overlap, and the occupation of the image dot locations in said colored area for each separation image is calculated by means of the half-tone algorithm.

4. A method according to claim 3, wherein said multi-color image is built up from a raster of matrix structures each consisting of a group of associated image dots of one or more different colors, wherein said corrected degree of coverage for each separation image is calculated with said correction algorithm such that said corrected degree of coverage corresponds to the required degree of coverage for said separation image plus the cumulated degree of coverage for all said separation images previously generated, and wherein said half-tone algorithm is based on a matrix-dither method in which the occupation of the image dot locations is calculated by comparison with a threshold matrix 5. A method according to claim 3, wherein said corrected degree of coverage for each separation image is calculated with said correction algorithm, such that said corrected degree of coverage corresponds to the quotient of the required degree of coverage for said image and the complement of the cumulated degree of coverage for all the separation images already generated previously, and wherein said half-tone algorithm is based on a method in which image dots are set aside at substantially arbitrary locations in said colored area.

6. A method according to claim 5, wherein said half-tone algorithm is based on an error-diffusion method.

7. A method according to claim 3, wherein each separation image is built up from a raster of matrix structures each consisting of a group of associated image dot locations, and a corrected degree of coverage for each separation image is calculated with said correction algorithm such that said corrected degree of coverage corresponds to the quotient of the required degree of coverage for said separation image and the complement of the cumulated degree of coverage for all the separation images previously generated and wherein said half-tone algorithm is based on a matrix-dither method in which the occupation of image dot locations is calculated by comparison with a threshold matrix, and wherein said rasters of the matrix structures of the various separation images are placed on each other under mutual different angles.

8. In apparatus for printing a multi-color image comprising at least one image registration element, means for generating separation images each built up of image dot patterns of toner powder in another color and an intermediate support for collecting the different colored separation images to form a multi-color image, the improvement therein comprises a surface covering of resilient material on said intermediate support, means to press at least each image registration element on which a second and each subsequent separation image is formed against said intermediate support with a force of no more than 1000 N per linear meter, and comparison means in said means for generating separation images to determine whether said second and each following separation image, as considered in the sequence in which the separation images are transferred onto the intermediate support, contain image dot patterns which are required to adjoin image dot patterns of one or more preceding separation images, and processing means to extend the second and each following separation image, with reference to the result of the comparison, with image dot patterns in areas where it is required to adjoin one or more preceding separation images, so that it at least partially overlaps said preceding separation images.

* * * * *